June 4, 1935.  J. H. WOODBERRY  2,003,327
SUPPORT
Filed June 23, 1933   2 Sheets-Sheet 1
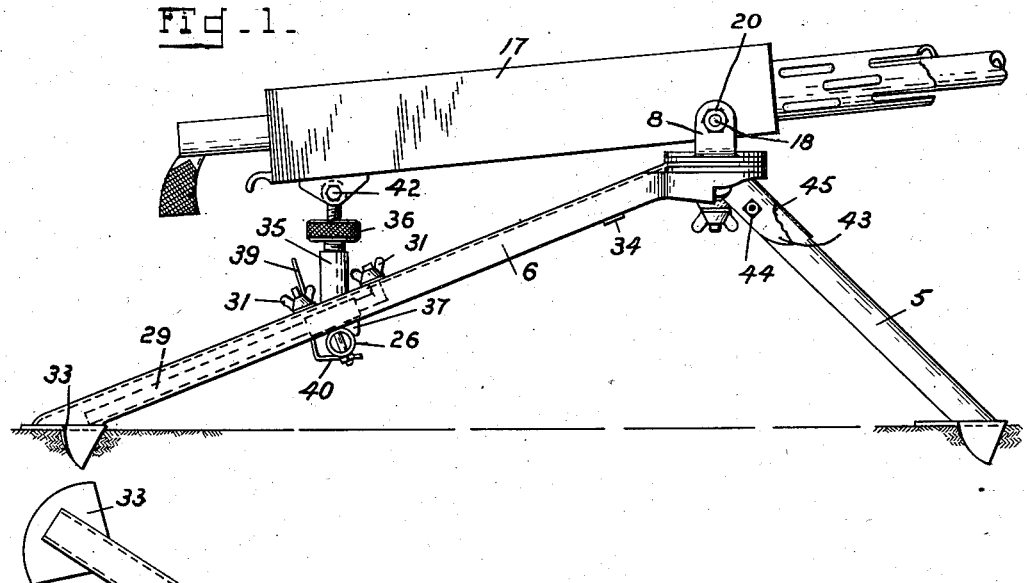
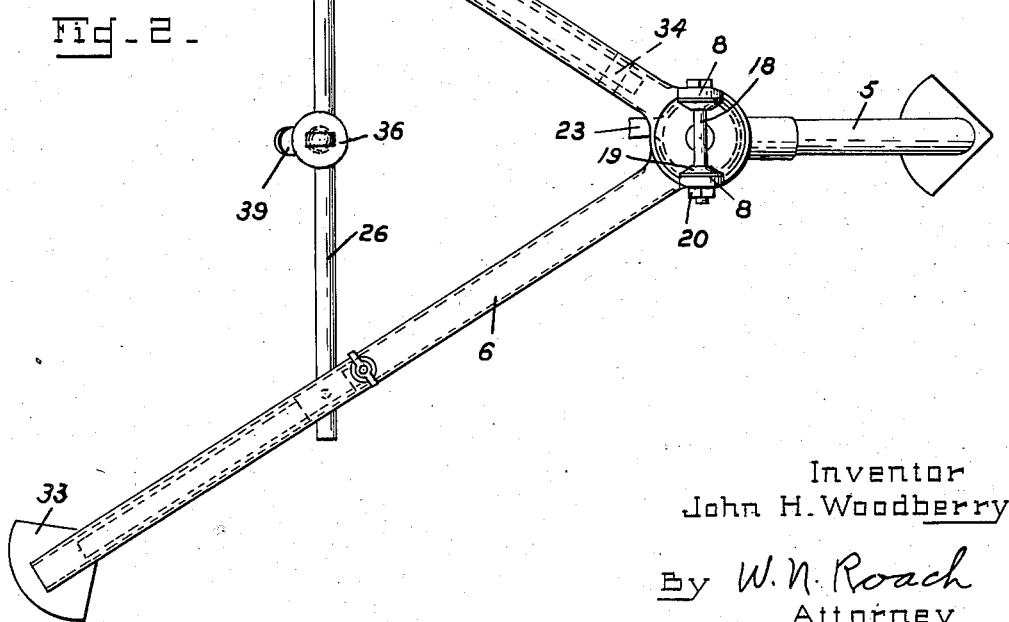
Inventor
John H. Woodberry
By W. N. Roach
Attorney June 4, 1935. J. H. WOODBERRY 2,003,327
SUPPORT
Filed June 23, 1933 2 Sheets-Sheet 2
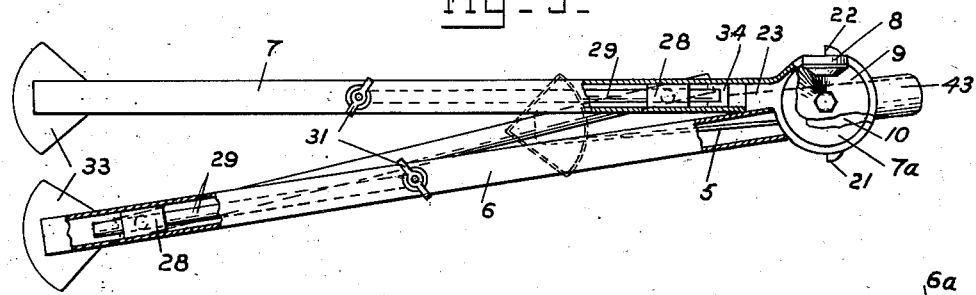
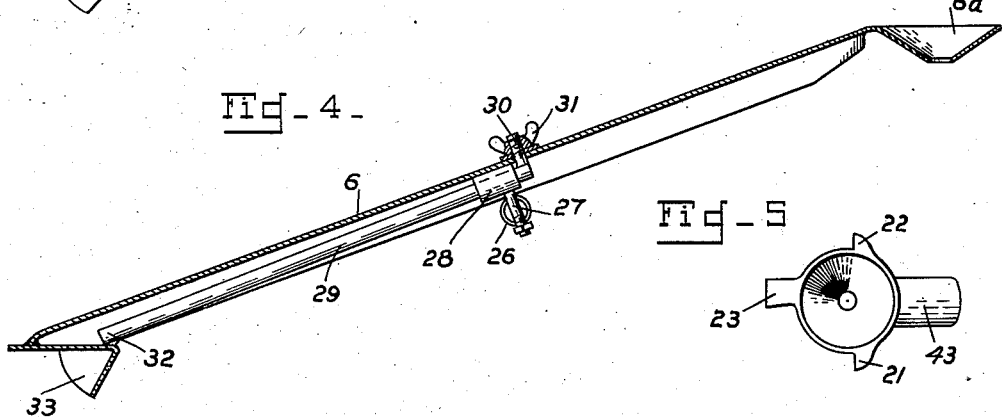
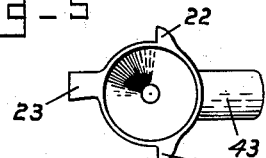
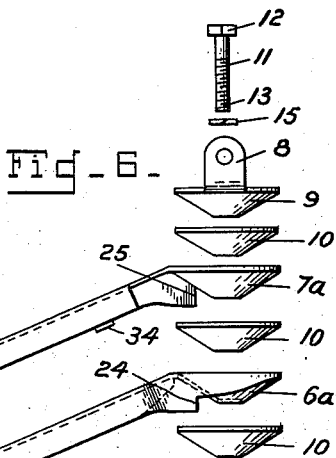
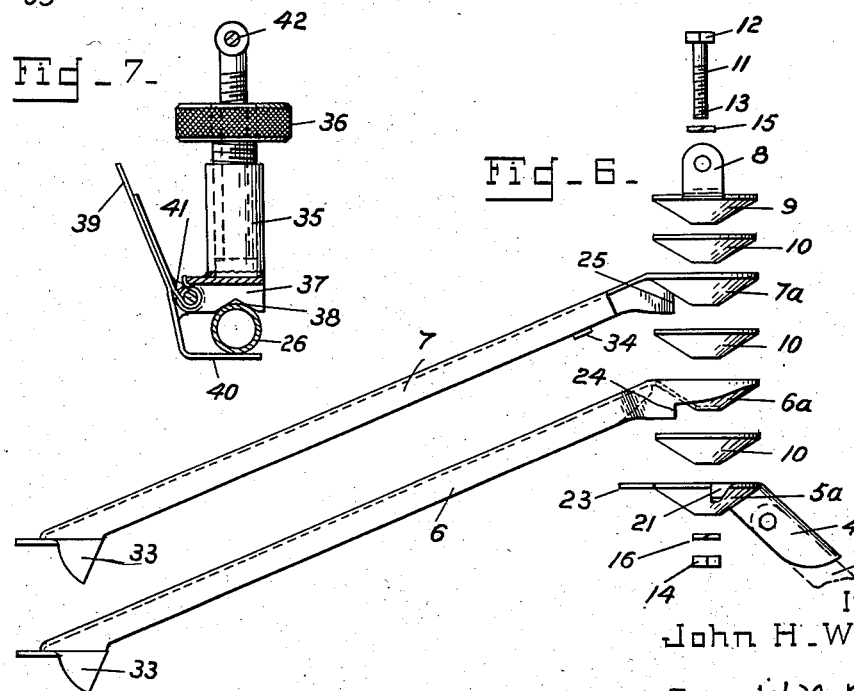
Inventor
John H. Woodberry
By- W. N. Roach
Attorney Patented June 4, 1935

2,003,327

UNITED STATES PATENT OFFICE 2,003,327

SUPPORT

John H. Woodberry, United States Army, Fort Bliss, Tex.

Application June 23, 1933, Serial No. 677,287

3 Claims. (Cl. 89—40)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a support and more particularly it has reference to a support formed by a plurality of legs and intended for mounting a gun.

The invention finds a general expression in a tripod whose meeting ends include relatively thin bearing plates arranged in parallel, superimposed relation and held together by a vertical pivot pin. A supporting member having a similar bearing plate arranged complementary to the bearing plates of the legs is also retained by the pivot pin and is free to be rotated thereon.

The invention further contemplates the provision of washers interposed between the bearing plates and means for resiliently confining the bearing plates and washers on the pivot pin.

The mount includes a novel arrangement for limiting opening of the trail legs and a cross bar for positively locking the trail legs in the open position. The cross bar is associated with an elevating mechanism which may be clamped thereto.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

A practical embodiment of the invention is illustrated in the accompanying drawings, wherein:

Fig. 1 is a view in side elevation of the improved support with a machine gun mounted thereon.

Fig. 2 is a plan view of the support in open or extended position.

Fig. 3 is a plan view, partly in section of the support in folded position.

Fig. 4 is a longitudinal sectional view of the right trail leg of the support.

Fig. 5 is a plan view of the bearing plate of the front leg.

Fig. 6 is a view in side elevation showing the arrangement of the parts prior to assembly and Fig. 7 is a view in side elevation of the elevating mechanism.

The tripod consists generally of a front leg 5 and a pair of rear or trail legs 6 and 7. In the preferred form the legs are U shaped in cross-section and are assembled with the open side disposed underneath towards the ground.

The head of the tripod is constituted by the meeting or pivot ends of the legs which are each provided with enlarged bearing plates (Fig. 6) respectively 5a, 6a and 7a. The plates are arranged to be superimposed in parallel relationship preferably with the bearing plate 5a of the front leg underneath and the bearing plate 7a of the left trail leg uppermost. A gun-supporting standard in the form of a clevis includes arms 8 of a flexible metal and a base 9 constituting a bearing plate conforming to the bearing plates on the legs and arranged to seat above the bearing plate 7a. Washers 10 are interposed between the bearing plates and afford means for obtaining uniformity and a degree of friction appropriate for smoothness of action and stability. The washers are preferably of leather and while their use is desirable, they may not be essential in all cases.

The bearing plates and friction washers are illustrated as being conical in shape. This is a preferred shape as it facilitates rigidity in assembly, lends itself to automatic adjustment and presents a larger friction area than a flat plate. It is to be clearly understood however that other shapes of plates may be employed with effectiveness.

The bearing plates and washers are all centrally apertured to receive a vertically disposed pivot pin 11 having a head 12 on its upper end and a threaded lower extremity 13 for receiving a nut 14. Spring washers 15 and 16 are respectively disposed between the head 12 and nut 14 and the adjoining bearing plates. The spring washers in addition to assisting in imparting flexibility, afford automatic means for wear adjustment and for maintaining uniform pressure between the bearing plates. This assembly, while holding the legs in stable contact, allows freedom of motion when the legs are to be opened or closed. The gun-supporting clevis which is likewise firmly held in its place in the tripod head is free to rotate in traverse while remaining stable against vibration due to the forces of discharge of the weapon mounted thereon. The nut 14 on the pivot pin serves as a means for obtaining tension adjustments.

The arms 8 of the gun supporting standard are, as previously mentioned, of a flexible metal to provide a yielding resistance in the connection between the arms and a gun 17 which is mounted on a trunnion pin 18 passing through the arms. When desirable, friction washers 19—19 are interposed between the arms and the sides of the gun. A nut 20 on the trunnion pin enables any degree of sustained frictional resistance to be obtained.

The bearing plate 5a of the front leg is provided on its rim with three projecting lugs, two of them designated 21 and 22 being substantially diametrically opposite one another and the remaining lug 23 being generally opposite to the leg 5 so that it will be disposed between the trail legs. The lugs 21 and 22 serve to limit opening or separation of the trail legs 6 and 7 and are respectively engaged by shoulders 24 and 25 on the legs. The lug 23 serves to limit closing of the legs and as shown in Fig. 3 bears externally against the inner side of the right leg 6 and internally against the outer side of the left leg 7.

While the pivot assembly and arrangement is generally sufficient to meet the requirements of rigidity there are advantages to be gained in having the legs definitely positioned by the lugs 21 and 22 and then securely locked in proper relation. The locking means consists of a traversing cross-bar 26 whose ends are arranged to have a sliding movement in opposite directions on the trail legs 6 and 7 when the trail legs are moved together. Specifically, each end of the cross-bar has a pivotal connection 27 with a sleeve 28 adapted to slide on a rod 29 carried by the trail leg. The rods 29 are arranged to enable the sleeves to move in opposite directions and to this end one rod is housed in the front part of one leg while the other rod is housed in the rear part of the other leg as clearly shown in Fig. 2.

Referring to Fig. 4, the rod 29 has an angled end 30 extending through an aperture in the leg and receiving a wing nut 31. The opposite end 32 of the rod is supported for free pivotal movement; in the right leg it rests on the spade 33 and on the left leg it rests on a stirrup 34.

Due to the weight of the cross-bar 26 and the rods 29 the wing nuts will normally rest on the trail legs. When the nuts are screwed down the rods 29 are raised and the cross-bar 26 is drawn tightly against the under sides of the legs. The sleeves 28 may also be drawn against the legs to assist in positively locking the cross-bar against movement.

Since the legs shown in the drawings are of U-section they lend themselves readily to the particular connection shown. It is apparent that variations in the legs may require modifications in the sliding and locking construction of the cross-bar.

A barrel 35 carrying a screw elevating mechanism 36 has a foot 37 provided with a recessed under side 38 adapted to engage the cross-bar 26 (Fig. 7). A clamp 39 pivotally mounted on the foot has an angled end 40 normally urged towards the recessed side 38 of the foot by a spring 41 and adapted to engage the under side of the cross-bar to prevent sliding movement of the elevating mechanism along the cross-bar. When it is desired to traverse the gun it is only necessary to release the pressure of the clamp on the cross-bar and then move the gun and elevating mechanism laterally. The elevating mechanism carries a pin 42 at its upper end whereby it is attached to the rear end of the gun.

When a straight traversing bar is employed, the elevating mechanism will be inclined as it moves laterally. This will result in a slight change in the angle of elevation of the gun. Where such a change is objectionable the traversing bar will obviously be curved on an appropriate arc.

In Fig. 1 the front leg 5 is shown as being attached to an inclined bracket 43 on the bearing plate 5a by means of a bolt 44. The under side of the bracket is open to enable the leg to be moved rearwardly underneath the rear legs while the upper side 45 of the bracket supports the front leg when the tripod is open. By omitting the lugs 21, 22 and 23 or by loosening the pivot assembly 11—14 the front leg may be rotated about the pivot pin 11 until it is in position under the rear legs.

When the gun and tripod are to be transported as a unit, the barrel 35 of the elevating mechanism is removed from the traversing cross-bar 26, which is then moved towards parallelism with the rear legs as in Fig. 3. The front leg is folded under the rear legs and the elevating mechanism is folded under the gun.

The operations involved in folding and unfolding the legs of the tripod may be easily and quickly performed.

The present tripod while being of light weight possesses considerable strength and affords sufficient stability to permit the accurate delivery of overhead and indirect fire.

I claim:

1. In a gun mount, a pair of legs foldable in a substantially common plane, a rod housed in the front part of one leg, a similar rod housed in the rear part of the other leg, said rods each having an angled end inserted through an approximately central portion of the leg in which it is housed, means on each leg freely supporting the other end of the rod, a nut on each angled end, a sleeve on each rod, and a cross-bar pivotally carried by the sleeves.

2. In a gun mount, a pair of legs foldable in a substantially common plane, a sleeve carried by each leg, the sleeves on the two legs slidable in opposite directions from an approximately central point, a bar pivotally secured to the sleeves, and means acting through the sleeves for drawing the bar against the legs whereby the bar is held against pivotal movement.

3. In a mount for guns, a pair of trails, a bar connected to the trails, an elevating mechanism having a recessed foot adapted to engage the bar, and a latch pivotally carried by the foot and having an angled end adapted to engage the bar.

JOHN H. WOODBERRY.